United States Patent [19]
Kornylak

[11] 3,826,347
[45] July 30, 1974

[54] CONVEYOR APPARATUS

[75] Inventor: Andrew T. Kornylak, Hamilton, Ohio

[73] Assignee: Kornylak Corporation, Hamilton, Ohio

[22] Filed: May 3, 1972

[21] Appl. No.: 249,987

[52] U.S. Cl. ............................... 198/20 R, 198/24
[51] Int. Cl. ......................................... B65g 47/00
[58] Field of Search ............... 198/154, 20, 156, 24; 214/16.1 CF, 16.1 DB

[56] References Cited
UNITED STATES PATENTS
1,786,485  12/1930  Ehrhart.......................... 198/154 X
2,950,804  8/1960   Ardner.............................. 198/24
FOREIGN PATENTS OR APPLICATIONS
1,438,620  4/1965   France............................ 198/20 R Primary Examiner—Evon C. Blunk
Assistant Examiner—Douglas D. Watts
Attorney, Agent, or Firm—Thomas E. Beall, Jr.

[57] ABSTRACT

The disclosure relates to apparatus for bringing the load-supporting surface of the tray of a vertical conveyor or elevator into horizontal alignment with the load-supporting surface of a horizontal conveyor and for transferring a pallet load between the tray and the horizontal conveyor. After the tray has been stopped at a transfer station, a pair of wedges carried by the horizontal conveyor is moved under the tray in engagement therewith to support the latter during transfer of the pallet load. The horizontal conveyor also carries shiftable means arranged to engage the under side of the load in order to displace it between the tray and the horizontal conveyor.

9 Claims, 2 Drawing Figures

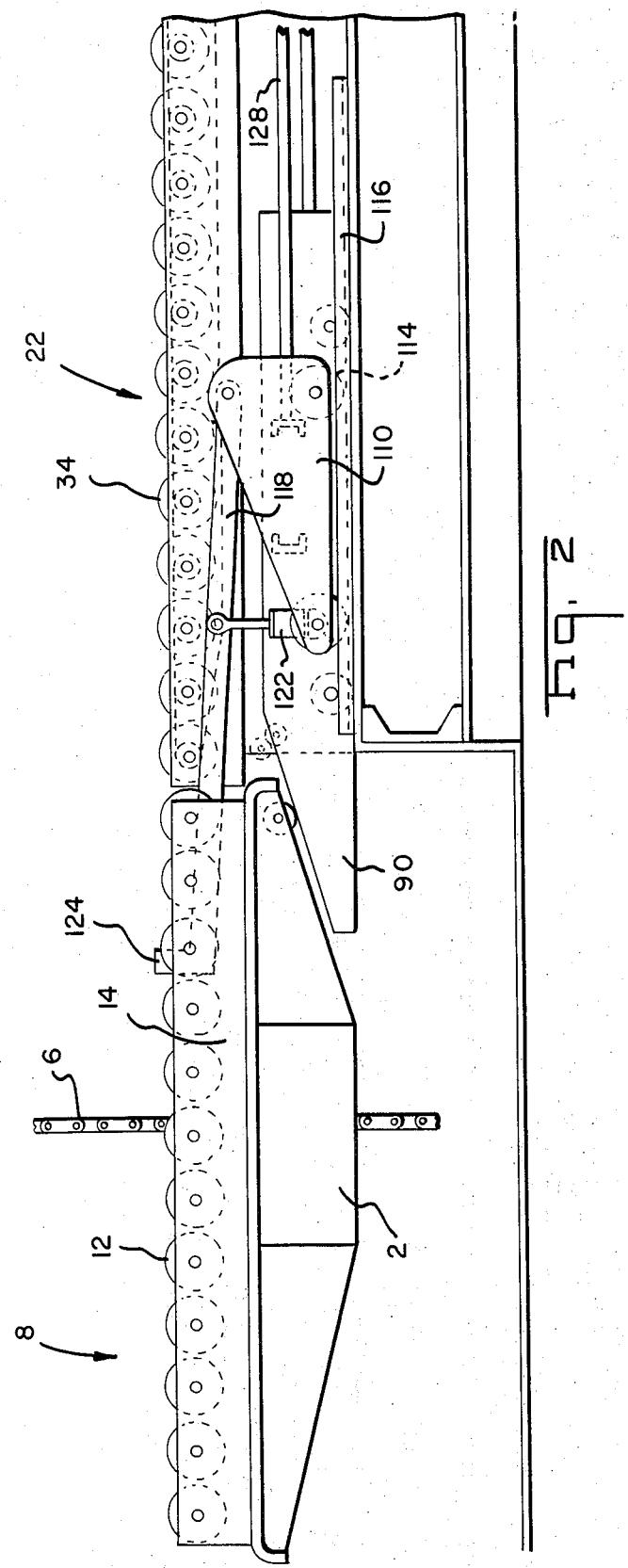

CONVEYOR APPARATUS

This invention relates to apparatus for transferring pallet loads to and from the stationary shelf or tray of an elevator-type vertical conveyor, which includes a horizontally shiftable transfer means for frictionally engaging the bottom of the pallet load, moving the load to or from the shelf, and then disengaging from the load.

Prior art systems for transferring pallet loads from one conveyor to another required a fork truck or pallet loader. Such systems are costly and have large space requirements. In accordance with the present invention, there is provided a conveyor transfer device which overcomes the disadvantages of the prior art systems and additionally compensates for differences in vertical tray position, system continuity and the like.

It is therefore an object of this invention to provide a transfer means mounted on a horizontal conveyor located at one or more of a series of vertically spaced stations.

It is another object of this invention to provide the transfer means with a friction contact member.

It is still another object of this invention to provide means for displacing the transfer means between a first position wherein its contact member is in engagement with the bottom of the pallet load and a second position wherein it is out of engagement with the load.

It is still another object of this invention to provide means for shifting the transfer means horizontally for moving a pallet load on and off the shelf.

The above objects and still further objects of the invention will immediately become apparent to those skilled in the art after consideration of the following preferred embodiment thereof, which is provided by way of example and not by way of limitation, wherein:

FIG. 2 is a side elevational view of the installation of FIG. 1.

Figure 1:
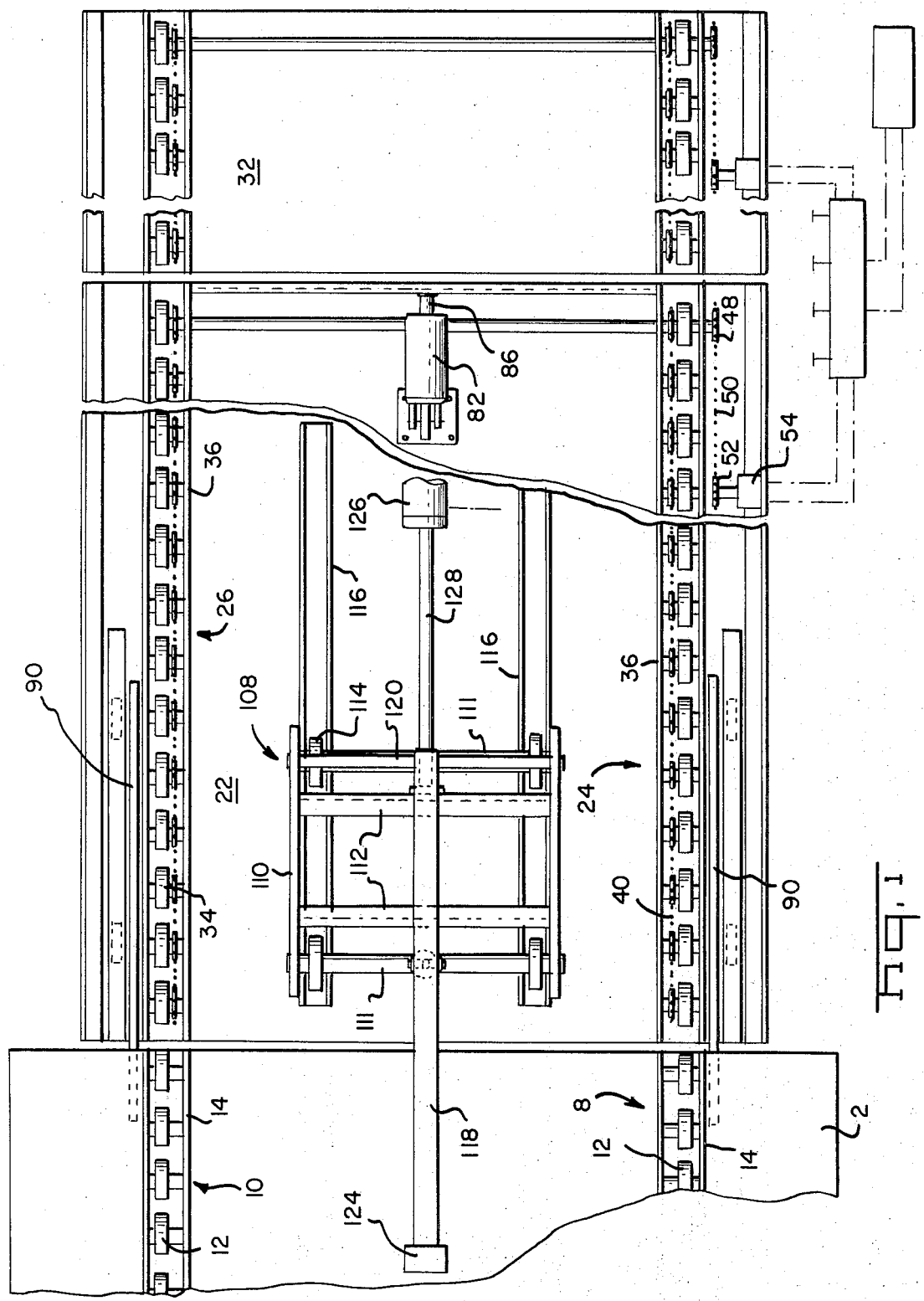
FIG. 1 is a plan view of an installation embodying the present invention.

A description of the details of the vertical conveyor system containing the shelf 2, but which does not form a part of the present invention may be found in my U.S. Pat. No. 3,365,052. The shelf itself carries a pair of roller tracks 8, 10 for supporting materials or articles while transporting the same between vertically spaced stations. Each track comprises a plurality of rollers 12, rotatably mounted in a channel 14.

A transfer conveyor 22 comprising a pair of tracks 24, 26 is shiftably mounted to move to and from the position adjacent to the elevator shown in the drawings. This transfer conveyor is substantially the same as that disclosed in my copending application Ser. No. 752,912, filed Aug. 15, 1968. However, the transfer conveyor of the present invention differs from that of the aforementioned earlier filed copending application in at least two respects. First, the apparatus of the present invention omits the means for transmitting power from the transfer conveyor 22 to the rollers 12 of the shelf 2, and second, the present invention includes a novel transfer means for moving a pallet load to and from the shelf.

The transfer means comprises a wheeled carriage 108 having rollers 114 which ride in guide tracks 116, the latter being fixedly mounted at the transfer station. Forming the carriage frame are side plates 110 connected by transverse struts 112. The wheels or rollers 114 are mounted on shafts 111 disposed transversely between plates 110. At the top of the carriage is mounted a transverse shaft 120 to which is connected one end of the load-shifting lever 118 and which serves as a pivot support for the latter. The lever 118 has an upwardly directed extension 124 at its free end designed for frictional engagement with the bottom of the pallet loads.

A fluid motor 126, one end of which is anchored to a fixed point, and having a piston rod 128 connected to one of the carriage struts 112, enables application of power to carriage 108 for imparting horizontal displacements to the carriage and the lever 118 carried thereby. A second fluid motor (FIG. 2), interposed between the carriage wheel shaft 111 and lever 118 is provided for effecting displacements of lever 118 about the pivot shaft 120, which in turn results in vertical displacement of the friction contact 124.

In practice, a shelf 2 is first stopped at one of the vertically spaced stations, whereupon the transfer conveyor 22 at the station, bearing a pallet load, is shifted horizontally in order to come into close proximity with the shelf. This shifting is effected by fluid motor 82 in the same manner set forth in said earlier filed patent application. At the same time, the wedges 90 are projected outwardly underneath the shelf to support the latter as shown in FIG. 2. Power is then applied to the rollers 34 to move the pallet load as far as possible toward the shelf.

The operational steps described thus far, as well as the means for effecting the same, do not constitute a part of the present invention, but are merely exemplary of a particular use thereof. They are substantially identical to corresponding features disclosed in the aforementioned copending application, to which reference may be made for a more complete disclosure of the details.

The next step is to shift the carriage 108 to a position wherein the contact member 124 is aligned under the pallet load. Motor 122 is then energized to raise lever 118 until the member 124 is in firm contact with the under side of the load. Next, motor 126 is energized to shift carriage 108 leftwardly together with lever 118 and the load. When the load has been moved completely on to the shelf, the motor 122 is energized in the reverse direction to disengage member 124 from the load, after which the motor 126 is energized in the reverse direction to withdraw carriage 108, lever 118 and contact 124. At this point, it is necessary to lock the shelf rollers 12 against rotation in order to obviate undesired displacements of the load during its subsequent vertical travel to the next station. Any of the available locking devices known in the art may be employed for this purpose. The vertical conveyor is now actuated to move the loaded shelf to the next station and to replace it by an empty shelf at the loading station and begin a new cycle.

At stations where the shelves of the vertical conveyor are to be unloaded, the cycle is similar to that just described except that the travel path of the contact member 124 is reversed, i.e., motors 122 and 126 are operated in such a manner that the contact member is first aligned under the load on the shelf but out of engagement therewith, raised into firm contact with the load, shifted outwardly horizontally, thereby moving the load off the shelf and on to the conveyor 22 and lowered away from the load.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. Load transferring and conveying apparatus, comprising: a transfer station; a generally vertical shelf conveyor having a plurality of individual shelves movable in a generally vertical direction past said transfer station, and each of said shelves having at least two first support means for direction engaging the load and being spaced from each other a substantial distance transverse to a predetermined direction for providing a free area under the load therebetween; a generally horizontal transfer conveyor at said transfer station having means for moving the load in said direction generally horizontally toward and away from the load transfer station, and said transfer conveyor having at least two second support means for directly engaging the load and being spaced from each other a substantial distance transverse to said direction for providing a free area therebetween; transfer means for moving the load from said transfer conveyor generally horizontally onto an adjacent shelf of said shelf conveyor at said transfer station with the load being primarily supported by only said first and second support means, including a generally horizontally translating carriage movable in said direction toward and away from the adjacent shelf, load engaging means being movably connected to said carriage, first power means for shifting said carriage and load engaging means from a first position wholly between said second support means of said transfer conveyor and removed from the vertical path of movement of the shelves of said shelf conveyor and a second position wherein said load engaging means extends in a position between said first support means of the adjacent shelf, and second power means for moving said load engaging means generally vertically between a first position wherein said load engaging means is wholly below said first and second support means of both said transfer conveyor and the adjacent shelf and a second position wherein said load engaging means extends at least partially vertically above said first and second support means of both said transfer conveyor and the adjacent shelf for engaging the load; said load engaging means engaging the underside of said load generally vertically without transfer of the primary weight components from said support means; said second support means including parallel generally horizontal runs of parallel axis rollers and means for selectively driving said rollers to move articles toward and away from the adjacent shelf; and said first support means for the shelves including parallel runs of parallel axis rollers respectively aligned with the runs of rollers for said transfer conveyor at the transfer station, and means for locking the shelf rollers selectively against rotation.

2. The apparatus of claim 1, said load engaging means being an arm elongated in said direction; said carriage including two parallel stationary tracks spaced from each other and parallel with said direction, a frame for pivotally mounting said arm about a horizontal axis generally perpendicular to said direction, and wheels rotatably mounted on said frame and being supported on said tracks, respectively.

3. The apparatus of claim 2, wherein each of said shelves and said carriage include wedge means aligned at the transfer station for engagement with movement of said carriage toward said shelf conveyor and having a first part carried by said carriage facing upwardly and a second part carried by the adjacent shelf facing downwardly for engagement along a wedge path extending upwardly and away from the adjacent shelf toward said transfer conveyor for aligning the adjacent shelf and transfer conveyor and further for supporting the edge of the shelf adjacent the transfer station during loading and unloading.

4. The apparatus of claim 3, wherein one of said parts is an inclined planar surface and the other of said parts is roller means for engaging said inclined planar surface.

5. The apparatus of claim 1, wherein each of said power means is a separate fluid operated piston-cylinder.

6. Load transferring and conveying apparatus, comprising: a transfer station; a generally vertical shelf conveyor having a plurality of individual shelves movable in a generally vertical direction past said transfer station, and each of said shelves having at least two first support means for directly engaging the load and being spaced from each other a substantial distance transverse to a predetermined direction for providing a free area under the load therebetween; a generally horizontal transfer conveyor at said transfer station having means for moving the load in said direction generally horizontally toward and away from the load transfer station, and said transfer conveyor having at least two second support means for directly engaging the load and being spaced from each other a substantial distance transverse to said direction for providing a free area therebetween; transfer means for moving the load from said transfer conveyor generally horizontally onto an adjacent shelf of said shelf conveyor at said transfer station with the load being primarily supported by only said first and second support means, including a generally horizontally translating carriage movable in said direction toward and away from the adjacent shelf, load engaging means being movably connected to said carriage, first power means for shifting said carriage and load engaging means from a first position wholly between said second support means of said transfer conveyor and removed from the vertical path of movement of the shelves of said shelf conveyor and a second position wherein said load engaging means extends in a position between said first support means of the adjacent shelf, and second power means for moving said load engaging means generally vertically between a first position wherein said load engaging means is wholly below said first and second support means of both said transfer conveyor and the adjacent shelf and a second position wherein said load engaging means extends at least partially vertically above said first and second support means of both said transfer conveyor and the adjacent shelf for engaging the load; said load engaging means engaging the underside of said load generally vertically without transfer of the primary weight components from said support means; said load engaging means being an arm elongated in said direction; and said carriage including two parallel stationary tracks spaced from each other and parallel with said direction, a frame for pivotally mounting said arm about a horizontal axis generally perpendicular to said direction, and wheels rotatably mounted on said frame and being supported on said tracks, respectively.

7. The apparatus of claim 6, wherein each of said shelves and said carriage include wedge means aligned at the transfer station for engagement with movement of said carriage toward said shelf conveyor and having a first part carried by said carriage facing upwardly and a second part carried by the adjacent shelf facing downwardly for engagement along a wedge path extending upwardly and away from the adjacent shelf toward said transfer conveyor for aligning the adjacent shelf and transfer conveyor and further for supporting the edge of the shelf adjacent the transfer station during loading and unloading.

8. Load transferring and conveying apparatus, comprising: a transfer station; a generally vertical shelf conveyor having a plurality of individual shelves movable in a generally vertical direction past said transfer station, and each of said shelves having at least two first support means for directly engaging the load and being spaced from each other a substantial distance transverse to a predetermined direction for providing a free area under the load therebetween; a generally horizontal transfer conveyor at said transfer station having means for moving the load in said direction generally horizontally toward and away from the load transfer station, and said transfer conveyor having at least two second support means for directly engaging the load and being spaced from each other a substantial distance transverse to said direction for providing a free area therebetween; transfer means for moving the load from said transfer conveyor generally horizontally onto an adjacent shelf of said shelf conveyor at said transfer station with the load being primarily supported by only said first and second support means, including a generally horizontally translating carriage movable in said direction toward and away from the adjacent shelf, load engaging means being movably connected to said carriage, first power means for shifting said carriage and load engaging means from a first position wholly between said second support means of said transfer conveyor and removed from the vertical path of movement of the shelves of said shelf conveyor and a second position wherein said load engaging means extends in a position between said first support means of the adjacent shelf, and second power means for moving said load engaging means generally vertically between a first position wherein said load engaging means is wholly below said first and second support means of both said transfer conveyor and the adjacent shelf and a second position wherein said load engaging means extends at least partially vertically above said first and second support means of both said transfer conveyor and the adjacent shelf for engaging the load; said load engaging means engaging the underside of said load generally vertically without transfer of the primary weight components from said support means; and each of said shelves and said carriage including wedge means aligned at the transfer station for engagement with movement of said carriage toward said shelf conveyor and having a first part carried by said carriage facing upwardly and a second part carried by the adjacent shelf facing downwardly for engagement along a wedge path extending upwardly and away from the adjacent shelf toward said transfer conveyor for aligning the adjacent shelf and transfer conveyor and further for supporting the edge of the shelf adjacent the transfer station during loading and unloading.

9. The apparatus of claim 8, wherein one of said parts is an inclined planar surface and the other of said parts is roller means for engaging said inclined planar surface.

* * * * *